United States Patent
Yang et al.

(10) Patent No.: US 8,396,439 B2
(45) Date of Patent: Mar. 12, 2013

(54) INTERFERENCE CANCELLATION CIRCUIT FOR A RECEIVER

(75) Inventors: Chao-Tung Yang, Hsinchu Hsien (TW);
Hung Chuan Pai, Hsinchu Hsien (TW);
Weigang Sun, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 1013 days.

(21) Appl. No.: 12/401,162

(22) Filed: Mar. 10, 2009

(65) Prior Publication Data

US 2010/0233984 A1    Sep. 16, 2010

(51) Int. Cl.
*H04B 1/10* (2006.01)

(52) U.S. Cl. .................. 455/296; 455/307; 455/63.1

(58) Field of Classification Search .............. 455/63.1, 455/296, 302, 303, 305, 306, 307
See application file for complete search history.

(56) References Cited

U.S. PATENT DOCUMENTS 6,161,004 A * 12/2000 Galal et al. ............ 455/302
2009/0068974 A1 * 3/2009 Smith ..................... 455/304

* cited by examiner

*Primary Examiner* — Christian Hannon
(74) *Attorney, Agent, or Firm* — Ming Chow; Sinorica, LLC (57) ABSTRACT

The invention discloses an interference cancellation circuit for a receiver to process an input signal which is carried on a first carrier frequency and includes a transmitted signal and at least one interference signals. The interference cancellation circuit comprises a down-converter for converting the input signal to dc location to generate a down-converted signal; a first path circuit for processing the down-converted signal to generate a first processed signal which includes the transmitted signal and the interference signals; a second path circuit for processing the down-converted signal to generate a second processed signal which includes only the interference signals; and a combiner for generating an output signal by combining the first processed signal and the second processed signal.

7 Claims, 8 Drawing Sheets

INTERFERENCE CANCELLATION CIRCUIT FOR A RECEIVER

BACKGROUND OF THE INVENTION

1. Field of the Invention

The present invention relates to an interference cancellation circuit, and more particularly to an interference cancellation circuit capable of performing interference cancellation of an incoming signal. The incoming signal includes a transmitted signal and at least one accompanying interference signals at the frond end of a receiver for wireless communication systems. The accompanying interference signals in the incoming signal are usually stronger than the transmitted signal so it may saturate the LNA (Low Noise Amplifier) and thereby ruin the transmitted signal.

2. Description of the Related Art

Figure 1A:
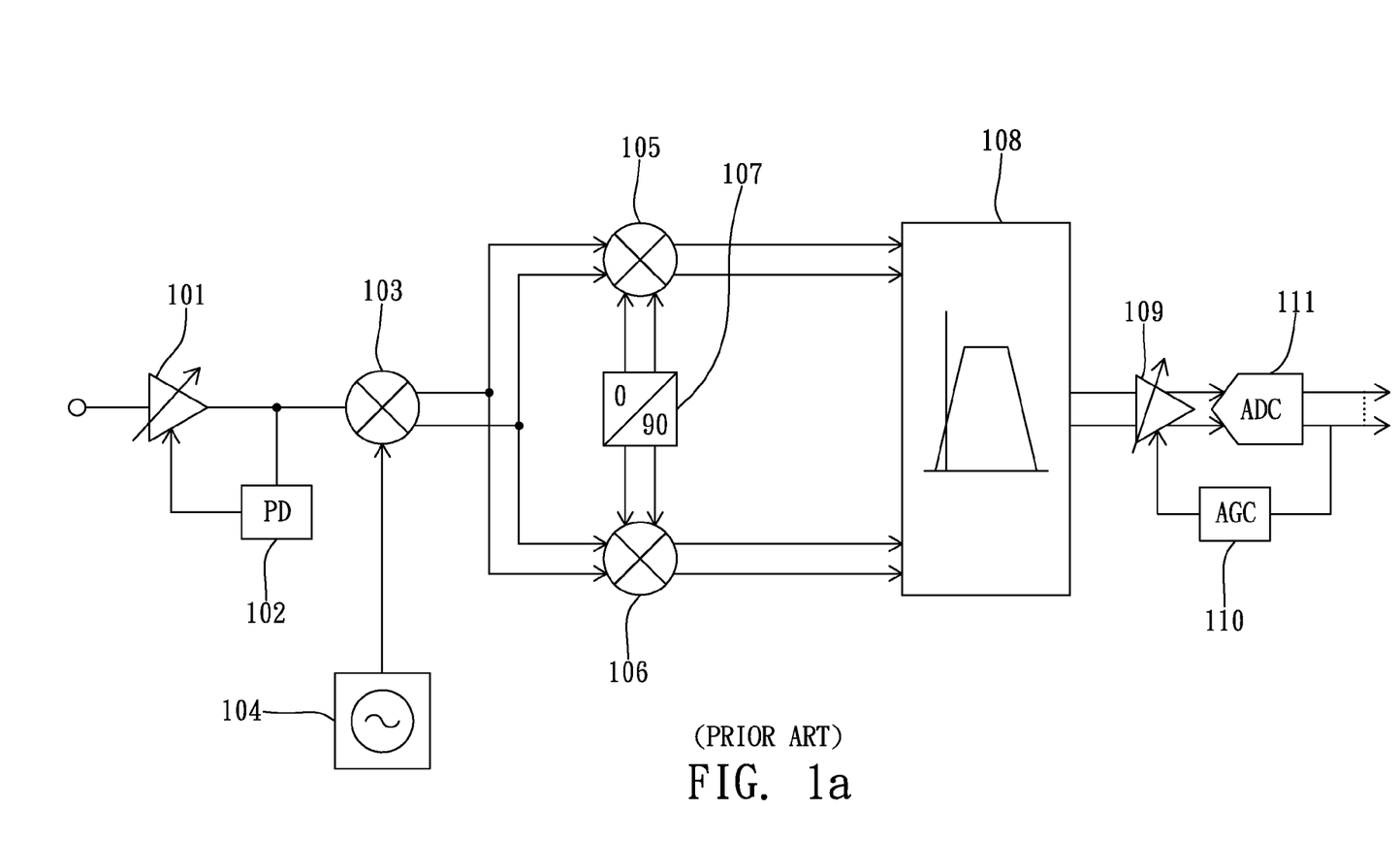
FIG. 1a is the block diagram of a typical wireless receiver.

To describe the related art of the present invention, the relation between a LNA and the other parts of a typical wireless receiver shall be introduced first. Please refer to FIG. 1a, which shows the architecture of a typical wireless receiver. As shown in FIG. 1a, the typical wireless receiver at least comprises a gain-controllable LNA (Low Noise Amplifier) 101, a power detector 102, a mixer 103, a local oscillator 104, a mixer 105, a mixer 106, a quadrature-phases type local oscillator 107, a complex filter 108, a variable-gain amplifier 109, an automatic gain controller 110 and an analog to digital converter 111.

Since the mixer 103, local oscillator 104, mixer 105, mixer 106, quadrature-phases type local oscillator 107, complex filter 108, variable-gain amplifier 109, automatic gain controller 110, and analog to digital converter 111 are well known and not the focus of the present invention, therefore they will not be further addressed hereafter.

The gain-controllable LNA 101 is used for amplifying an incoming signal comprising a transmitted signal and some possible interference signals. The power detector 102 is incorporated in around the gain-controllable LNA 101 to adjust the gain of the gain-controllable LNA 101 in response to the power of the incoming signal. If there come the possible interference signals, which are usually stronger than the transmitted signal in the incoming signal, the power detector will detect a larger power and then send a signal to lower the gain of the gain-controllable LNA 101 to prevent saturation. However, the noise figure will be increased due to the lowered gain of the gain-controllable LNA 101. The noise budget of the typical wireless receiver is usually so tight that the increased noise figure of the output of the gain-controllable LNA 101 will encroach on the noise figures of the other parts of the receiver. Therefore, there is a demand to lower down the noise figure of the LNA to yield room for the noise figure of the other parts of the receiver.

Figure 2:
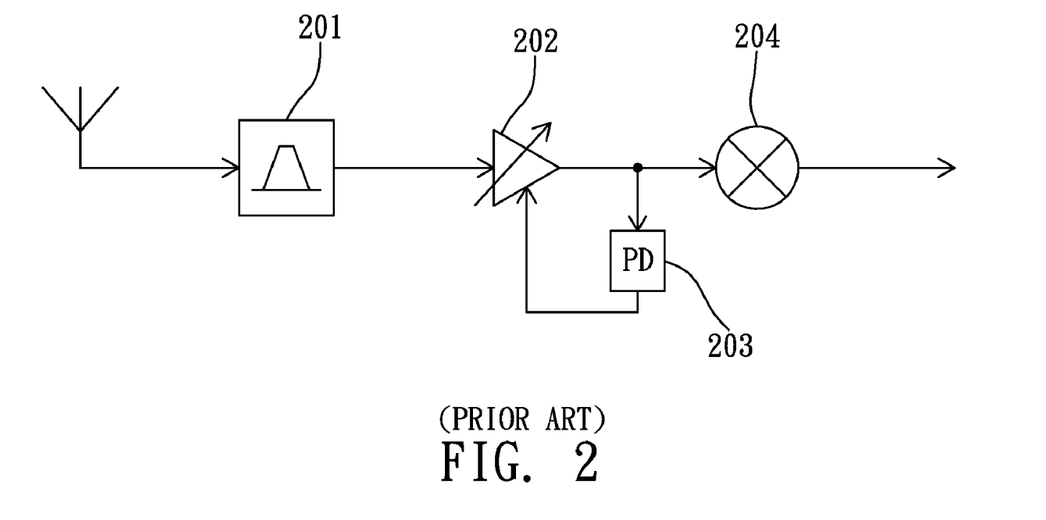
FIG. 2 is a block diagram of a prior art technology for eliminating interference.

One solution to eliminate the possible interference signals is to insert a SAW filter before the LNA. Please refer to FIG. 2, which shows a block diagram of a prior art for eliminating the interference signals of an incoming signal. As shown in FIG. 2, the prior art comprises a SAW filter 201, a gain-controllable LNA 202, a power detector 203 and a mixer 204.

The SAW filter 201 is used to filter out the interference signals. However, the adoption of the SAW filter 201 will occupy additional board area in the circuit, add more component cost, and cause noise figure degradation due to a SAW filter's insertion loss.

Figure 3:
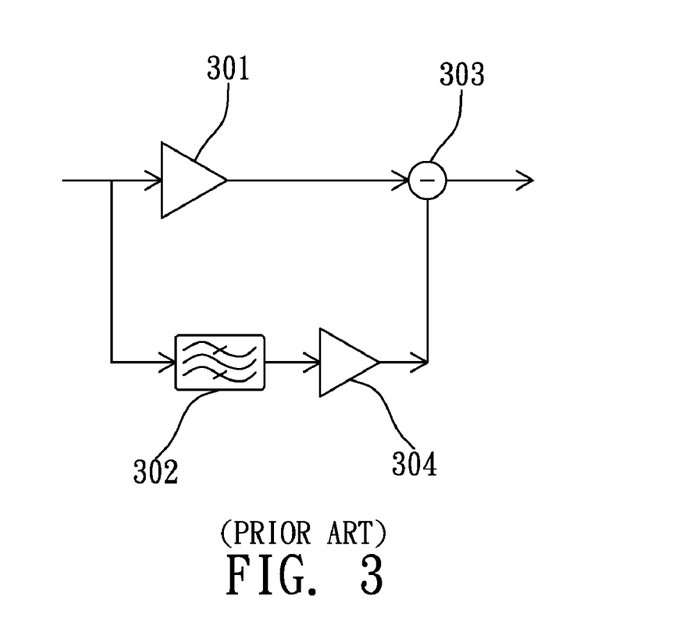
FIG. 3 is a block diagram of another prior art technology for eliminating interference.

Another solution is to implement a second path comprising a notch filter to retain only the interference signals, and then subtract the output of the second path from the output of the LNA. Please refer to FIG. 3, which shows a block diagram of another prior art named feed-forward technique. As shown in FIG. 3, the feed-forward technique comprises a LNA 301, an RF notch filter 302, a subtractor 303 and an amplifier 304.

The RF notch filter 302 is used for filtering out the transmitted signal and retaining the interference signals intended to be mutually cancelled out with the interference signals of the other path at the subtractor 303. However, the phase shifts of the two paths are different due to unsymmetrical structures, so the effect of interference cancellation is limited. Besides, a high quality RF filter is physically difficult to be implemented on-chip and the high insertion loss of the on-chip RF filter if at all will also significantly degrade the receiver sensitivity.

Figure 4:
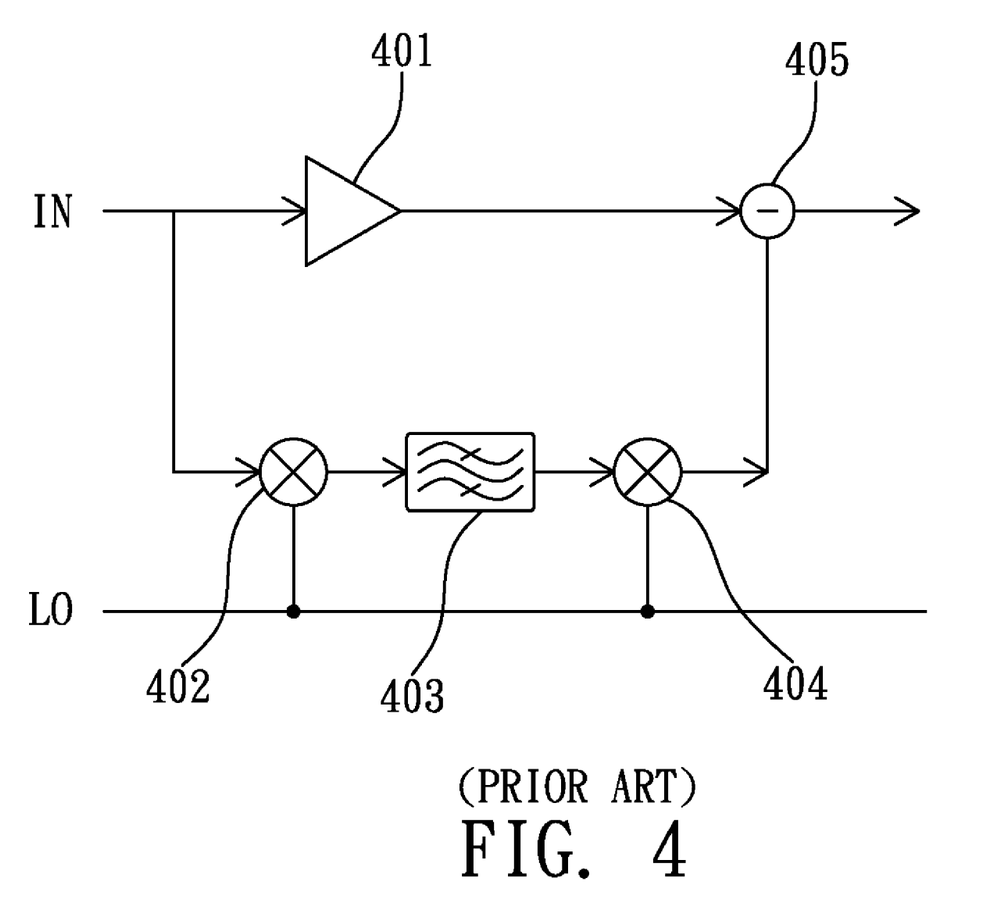
FIG. 4 is a block diagram of still another prior art technology for eliminating interference.

Still another solution is to implement a second path including two mixers and a HPF (High Pass Filter) to retain only the interference signals, and then subtract the output of the second path from the output of the LNA. Please refer to FIG. 4, which shows a block diagram of still another prior art technology named translational-loop technique. As shown in FIG. 4, the translational-loop technique comprises a LNA 401, a mixer 402, a HPF (High Pass Filter) 403, a mixer 404 and a subtractor 405.

The combination of the mixer 402, HPF 403 and mixer 404 acts as an RF notch filter used to filter out the transmitted signal and retain the interference signals intended to be mutually cancelled out with the interference signals of the other path at the subtractor 405. However, the mixer 402 and mixer 404 will produce additional images, and the phase shifts of the two paths are different due to unsymmetrical structures, so the effect of interference cancellation is limited. Therefore, there needs a technology able to offer superior performance in interference cancellation at the front end of the wireless receiver with concise structure and minimum cost.

SUMMARY OF THE INVENTION

In view of the description above, an objective of the present invention is to provide an effective and robust means of interference cancellation of an incoming signal containing a transmitted signal and at least one accompanying interferer at the frond end of a receiver for wireless communication systems.

A still another objective of the present invention is to further provide a novel complementary translational loop architecture capable of efficiently cancelling the at least one accompanying interferer around the transmitted signal with a frequency conversion scheme and a two-symmetric-paths architecture.

The present novel means of interference cancellation, with the proposed frequency conversion scheme and the two-symmetric-paths architecture, can be utilized to greatly reduce the at least one accompanying interferer around the transmitted signal and reduce the associate images at the frond end of a receiver for wireless communication systems.

The invention discloses an interference cancellation circuit for a receiver capable of performing interference cancellation on an input signal, said input signal being carried on a first carrier frequency and including a transmitted signal and at least one interference signals. The interference cancellation circuit comprises a down-converter for converting the input signal from the first carrier frequency to dc location to generate a down-converted signal; a first path circuit for processing the down-converted signal to generate a first processed signal, wherein the first processed signal includes the transmitted signal and the interference signals; a second path circuit for processing the down-converted signal to generate a second processed signal without the transmitted signal, wherein the second processed signal only includes the interference signals; and a combiner for generating an output signal by combining the first processed signal and the second processed signal.

The way of interference cancellation is due to the design of the present invention that the first processed signal is composed of a signal part and an interference part, the second processed signal is composed of another interference part, and both interference parts of the first processed signal and second processed signal are ether identical or complementary that both parts can be combined to be cancelled out.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1B:
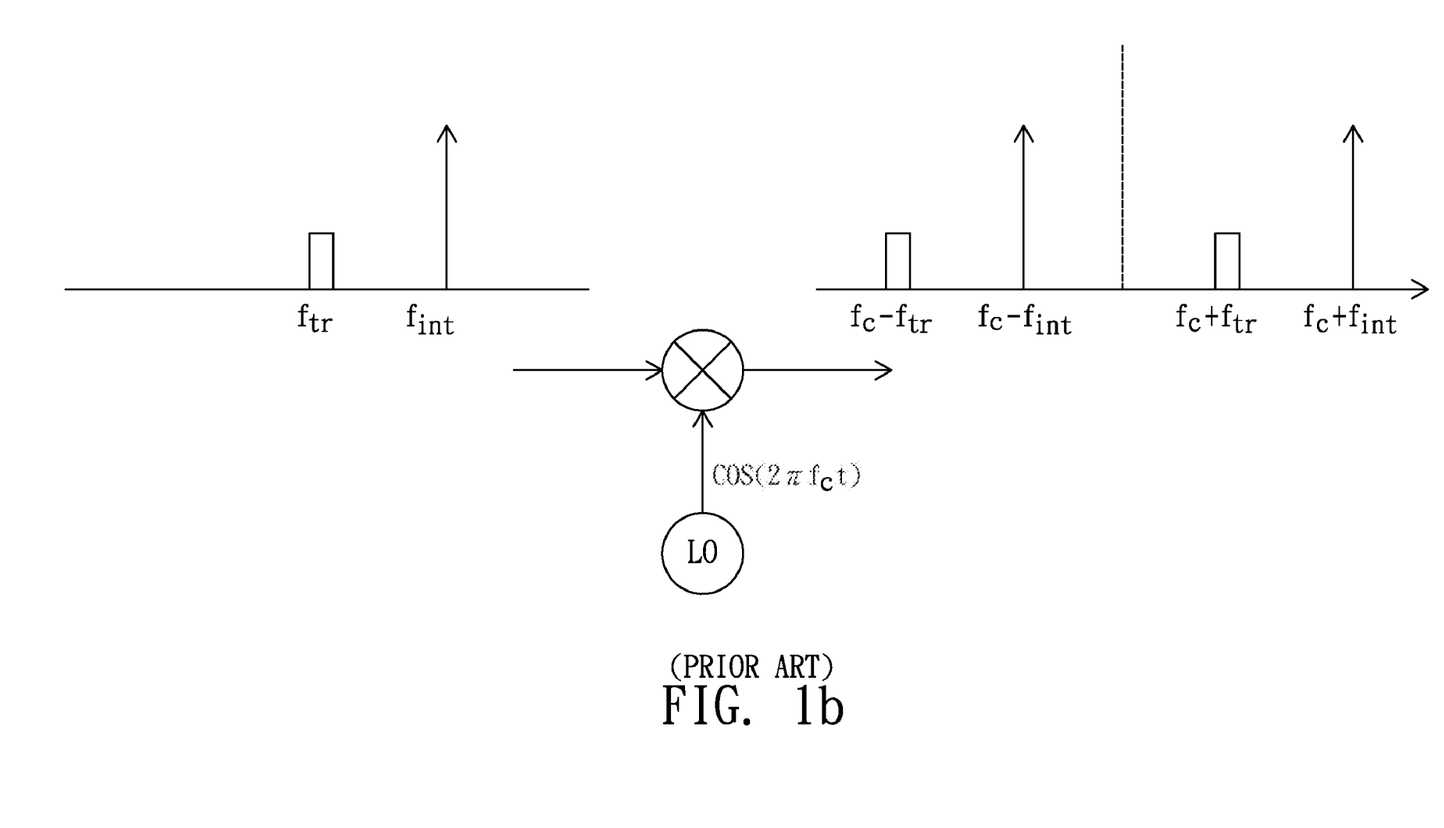
FIG. 1b is the illustrating diagram of a mixer operation.

As is known in the wireless communication, the frequency conversion of a signal $\cos(2\pi f_s t)$ performed with a mixer according to a carrier signal $\cos(2\pi f_c t)$ of frequency $f_c$ can be expressed as $$\cos(2\pi f_s t) \times \cos(2\pi f_c t) = (1/2)\{\cos(2\pi (f_c + f_s)t) + \cos(2\pi (f_c - f_s)t)\},$$

i.e. the signal located at $f_s$ will be converted to a signal located at $f_c - f_s$ and simultaneously an image signal located at $f_c + f_s$. Now consider an incoming signal composed of a transmitted signal $\cos(2\pi f_{tr} t)$ located at $f_{tr}$ and an interferer $\cos(2\pi f_{int} t)$ located at $f_{int}$, the incoming signal being converted with a mixer according to a carrier signal $\cos(2\pi f_c t)$ of frequency $f_c$. As a result, there will be four components in the converted signal located at $f_c - f_{tr}$, $f_c - f_{int}$, $f_c + f_{tr}$, $f_c + f_{int}$ respectively (as shown in FIG. 1b).

As mentioned in the description of the related art, the RF filter of the feed-forward technique is not easy to be implemented on-chip with high quality. Therefore, the translational-loop technique proposes to down convert the signal to a low frequency with a mixer before proceeding filtering. This will make the realization of the high quality filter on-chip more easily. However, due to the associate images produced by the mixer, and to the unsymmetrical structures of the two signal paths, the effect of interference cancellation is rather limited. So there needs a novel solution to conquer the tangled problems involved in the filter design and image cancellation.

To solve the tangled problems, the present invention first proposes a two-symmetric-paths architecture. Next, the present invention manages to process the spectrum of signals in both paths according to a goal that the spectrum composition of the signal at the output terminal of the first path differs from the spectrum composition of the signal at the output terminal of the second path only at the location of the transmitted signal. The transmitted signal is retained in the first path and filtered out in the second path. To make the spectrum processing easier to accomplish, the filtering process should be performed in the low-frequency band. Then, after restoring to the original band, the interference signals can be cancelled out by combining the output of these two paths. The proposal of the present invention mentioned above implies that:

a) a mixer may be needed to down convert an incoming signal to the dc location to facilitate the filter design, and another mixer is needed to up convert the filtered signal;

b) a filter in the first path is to be designed to retain the transmitted signal and a certain set of interference signals, and another filter in the second path is to be designed to retain the certain set of interference signals and filter out the transmitted signal; and c) the images produced by the mixers are symmetric in both paths so can be cancelled out by subtraction.

To accomplish these goals, the present invention first utilizes a local oscillator for generating an oscillating signal of which the frequency is equal to the carrier frequency of the incoming signal. The oscillating signal can be coupled to the mixers to perform frequency down conversion and up conversion. With this oscillating frequency, two advantages can be obtained. First, the high quality filters are easier to design at the low-frequency band. Second, less images will be produced due to the resulting dc location of the subtraction of two same frequencies.

For the design of the filters of the two paths, the gains should be the same and the phase shifts of the retained interference signals in both paths should be as close as possible. As is known in the filter design, the phase responses in pass bands of a LPF, a BPF, a HPF, and an APF are not the same, so the pass bands of the related filters in both paths should be adjusted according to the possible location of the interference signals to make the phase shifts of an interferer in both paths as close as possible. Common filter scheme such as the Butterworth filter can be utilized to suffice the need.

Further, the signal paths of the present invention can be of a mode selected from the group consisting of single end mode, differential mode, and combinations thereof. According to the concept mentioned above, there could be a variety of modified versions therefrom.

In this specification, some of the preferred embodiments of the present invention will be disclosed.

Figure 5:
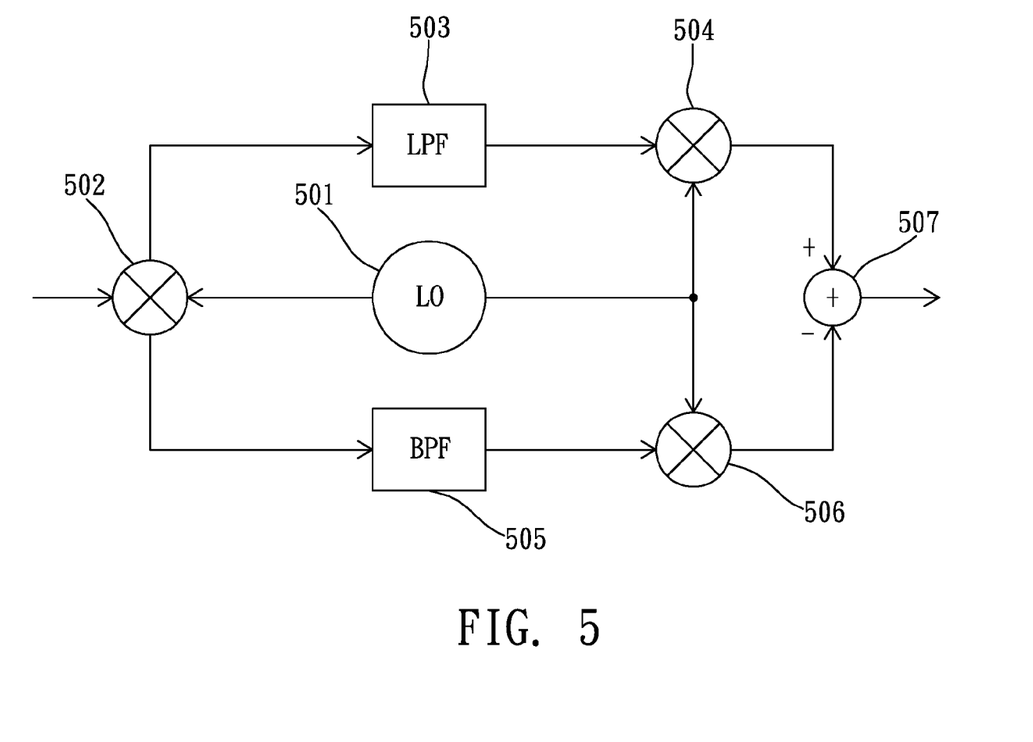
FIG. 5 is a block diagram of a preferred embodiment of the present invention for interference cancellation.

Please refer to FIG. 5, which shows the block diagram of a preferred embodiment of interference cancellation circuit of the present invention. As shown in the FIG. 5, the block diagram includes a LO (Local Oscillator) 501, a mixer 502, a LPF (Low Pass Filter) 503, a mixer 504, a BPF (Band Pass Filter) 505, a mixer 506 and a combiner 507.

In this embodiment, the LO 501 is used for generating an oscillating signal at the carry frequency of an incoming signal. The incoming signal is composed of a transmitted signal and at least one interference signals. The signal path of the LO 501 is the differential mode, and the LO 501 is the single-phase type.

The mixer 502 is used for generating a first converted signal carried on dc location and a second converted signal carried on dc location according to the incoming signal under the control of the oscillating signal.

The LPF 503 is a second order Butterworth low pass filter used for retaining a first filtered signal according to the first converted signal. The pass band of the filter is adjusted according to the possible locations of the interference signals and images so that the first filtered signal is composed of a first path retained signal and a first path retained interference signals. For example, if the incoming signal is composed of a transmitted signal located at 900 $MH_z$ and one interferer located at 1000 $MH_z$, then after the processing of the mixer 502 there will be four products located at dc, 100 $MH_z$, 1800 $MH_z$, and 1900 $MH_z$ respectively. In this case, the pass band of the LPF 503 can be designed to retain the transmitted signal at dc and the interferer at 100 $MH_z$.

The mixer 504 is used for generating a first processed signal carried on the first carrier frequency according to the first filtered signal under the control of the oscillating signal. The first processed signal is composed of a plurality of first path interference signals, and a first output signal which is proportional to the original signal.

The BPF 505 is a second order Butterworth band pass filter used for retaining a second filtered signal carried on the second carrier frequency according to the second converted signal. The pass band of the filter is adjusted according to the pass band of the LPF 503 so that the second filtered signal is composed of a second path retained the interference signals of which the spectrum profile is close to that of the first path retained the interference signals. For example, since the LPF 503 has retained an interferer at 100 $MH_z$, the BPF 505 should then retain only the interferer at 100 $MH_z$, and the pass band should be adjusted to let the amplitude and phase of the interferer at 100 $MH_z$ be close to that of the counterpart in LPF 503.

The mixer 506 is used for generating a second processed signal according to the second filtered signal under the control of the oscillating signal. The second processed signal is composed of the interference signals in the second path, and the spectrum profile of the interference signals in the second path is similar to that of the interference signals of the first path.

The combiner 507 is used for generating an output signal which is proportional to the first output signal by subtracting the second processed signal from the first processed signal.

Figure 6:
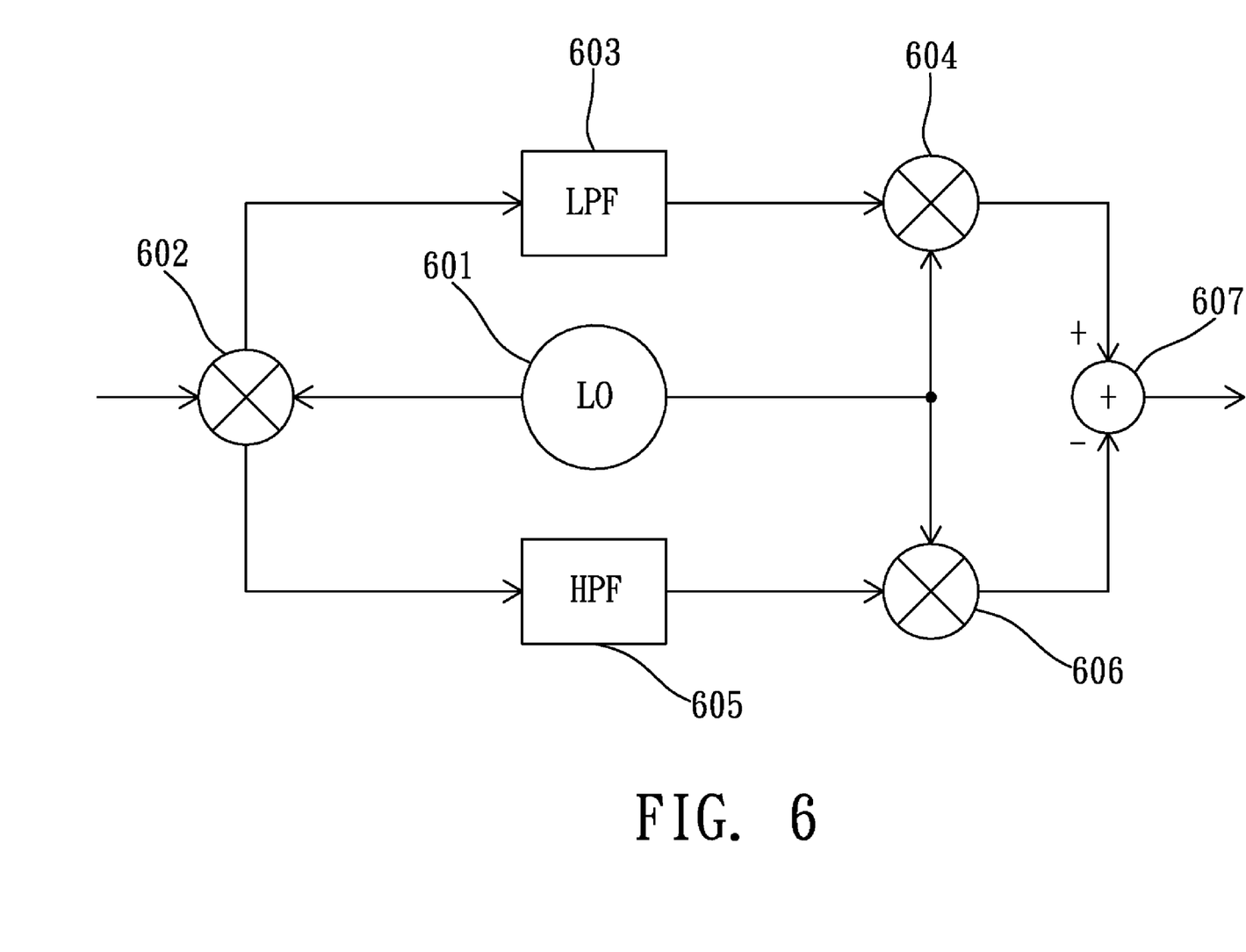
FIG. 6 is a block diagram of another preferred embodiment of the present invention for interference cancellation.

Please refer to FIG. 6, which shows the block diagram of another preferred embodiment of interference cancellation circuit of the present invention. As shown in the FIG. 6, the block diagram includes a LO (Local Oscillator) 601, a mixer 602, a LPF (Low Pass Filter) 603, a mixer 604, a HPF (High Pass Filter) 605, a mixer 606 and a combiner 607.

In this embodiment, the LO 601 is used for generating an oscillating signal at the carry frequency of an incoming signal. The incoming signal is composed of a transmitted signal and at least one interference signals. The signal path of the LO 601 is the differential mode.

The mixer 602 is used for generating a first converted signal located on dc and a second converted signal located on dc according to the incoming signal under the control of the oscillating signal.

The LPF 603 is a second order Butterworth low pass filter used for retaining a first filtered signal according to the first converted signal. The pass band of the filter is adjusted according to the possible locations of the interference signals so that the first filtered signal is composed of a first path retained signal and a first path retained interference signals. For example, if the incoming signal is composed of a transmitted signal located at 900 $MH_z$ and one interferer located at 1000 $MH_z$, then after the processing of the mixer 602 there will be four products located at dc, 100 $MH_z$, 1800 $MH_z$, and 1900 $MH_z$ respectively. In this case, the pass band of the LPF 603 can be designed to retain the four products.

The mixer 604 is used for generating a first processed signal carried on the first carrier frequency according to the first filtered signal under the control of the oscillating signal. The first processed signal is composed of a plurality of first path interference signals, and a first output signal which is proportional to the original signal.

The HPF 605 is a second order Butterworth high pass filter used for retaining a second filtered signal carried on the second carrier frequency according to the second converted signal. The pass band of the filter is adjusted according to the pass band of the LPF 603 so that the second filtered signal is composed of a second path retained interference signals of which the spectrum profile is close to that of the first path retained interference signals. For example, since the LPF 603 has retained all four products, the HPF 605 should then filter out only the transmitted signal at dc location, and the pass band should be adjusted to let the amplitude and phase of the interferer at 100 $MH_z$ and the images at 1800 $MH_z$ and 1900 $MH_z$ be close to that of the counterpart in LPF 603.

The mixer 606 is used for generating a second processed signal according to the second filtered signal under the control of the oscillating signal. The second processed signal is composed of the interference signals in second path. And the spectrum profile of the interference signals in second path is similar to that of the interference signals in first path.

The combiner 607 is used for generating an output signal which is proportional to the first output signal by subtracting the second processed signal from the first processed signal.

Figure 7:
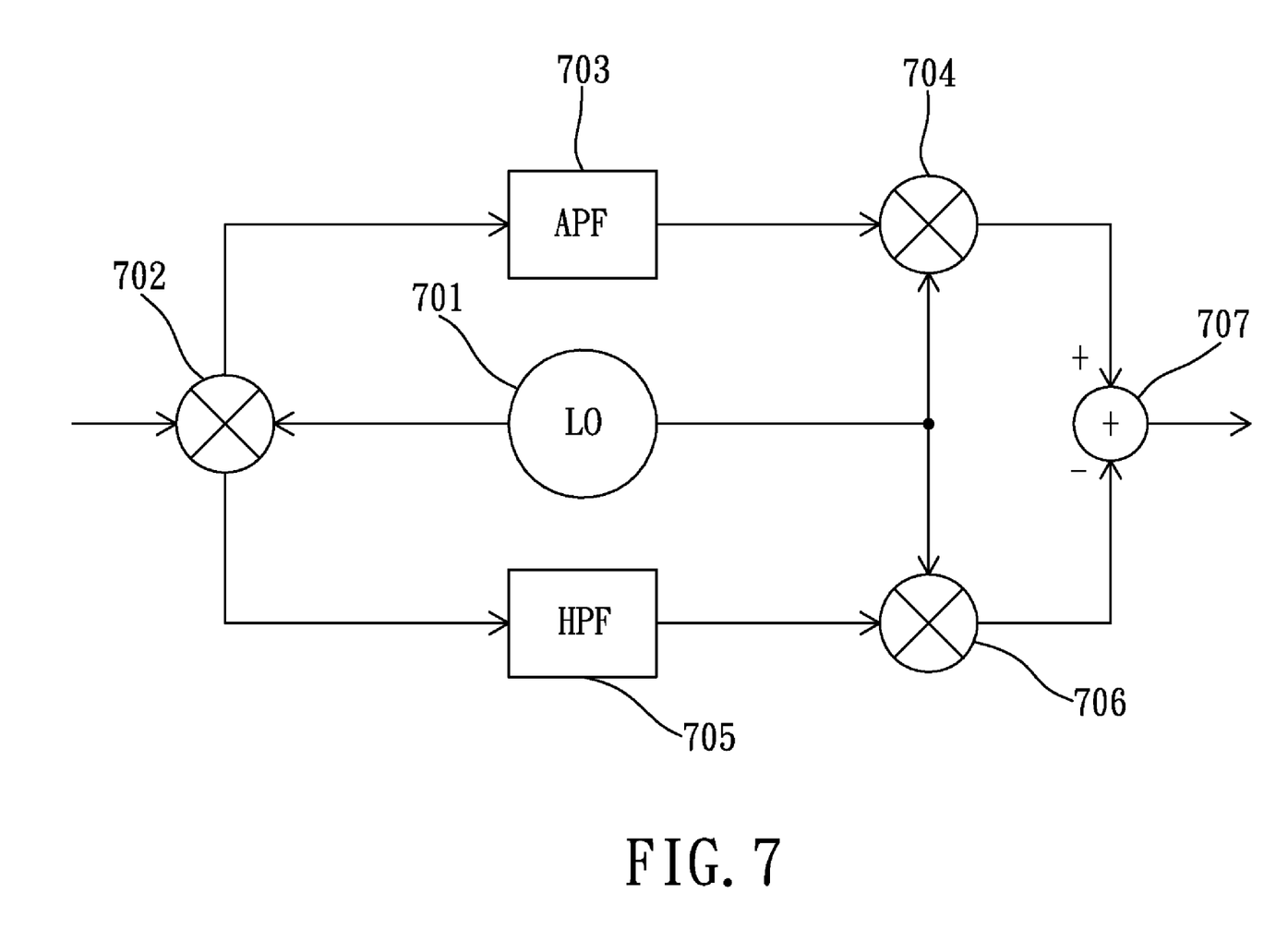
FIG. 7 is a block diagram of another preferred embodiment of the present invention for interference cancellation.

Please refer to FIG. 7, which shows the block diagram of another preferred embodiment of interference cancellation circuit of the present invention. As shown in the FIG. 7, the block diagram includes a LO (Local Oscillator) 701, a mixer 702, an APF (All Pass Filter) 703, a mixer 704; a HPF (High Pass Filter) 705, a mixer 706 and a combiner 707.

In this embodiment, the LO 701 is used for generating an oscillating signal at the carry frequency of an incoming signal. The incoming signal is composed of a transmitted signal and at least one interferer. The signal path of the LO 701 is of differential mode, and the LO 701 is of single-phase type.

The mixer 702 is used for generating a first converted signal located on dc and a second converted signal located on dc according to the incoming signal under the control of the oscillating signal.

The APF 703 is a second order Butterworth all pass filter used for retaining a first filtered signal according to the first converted signal. The first filtered signal is composed of a first path retained signal and a first path retained interference signals.

The mixer 704 is used for generating a first processed signal carried on the first carrier frequency according to the first filtered signal under the control of the oscillating signal. The first processed signal is composed of a plurality of first path interference signals, and a first output signal which is proportional to the original signal.

The HPF 705 is a second order Butterworth high pass filter used for retaining a second filtered signal carried on the second carrier frequency according to the second converted signal. The pass band of the filter is adjusted according to the possible locations of the interference signals and images so that the second filtered signal is composed of a second path retained interference signals of which the spectrum profile is close to that of the first path retained interference signals. For example, if the incoming signal is composed of a transmitted signal located at 900 MH$_Z$ and one interferer located at 1000 MH$_Z$, then after the processing of the mixer 702 there will be four products located at dc, 100 MH$_Z$, 1800 MH$_Z$, and 1900 MH$_Z$ respectively. In this case, since the APF 703 has retained all four products, the HPF 705 should then filter out only the transmitted signal at dc location, and the pass band should be adjusted to let the amplitude and phase of the interferer at 100 MH$_Z$ and the images at 1800 MH$_Z$ and 1900 MH$_Z$ be close to that of the counterpart in APF 703.

The mixer 706 is used for generating a second processed signal according to the second filtered signal under the control of the oscillating signal. The second processed signal is composed of a plurality of second path interference signals of which the spectrum profile is close to that of the plurality of the first path interference signals. The combiner 707 is used for generating an output signal which is proportional to the first output signal by subtracting the second processed signal from the first processed signal.

Figure 8:
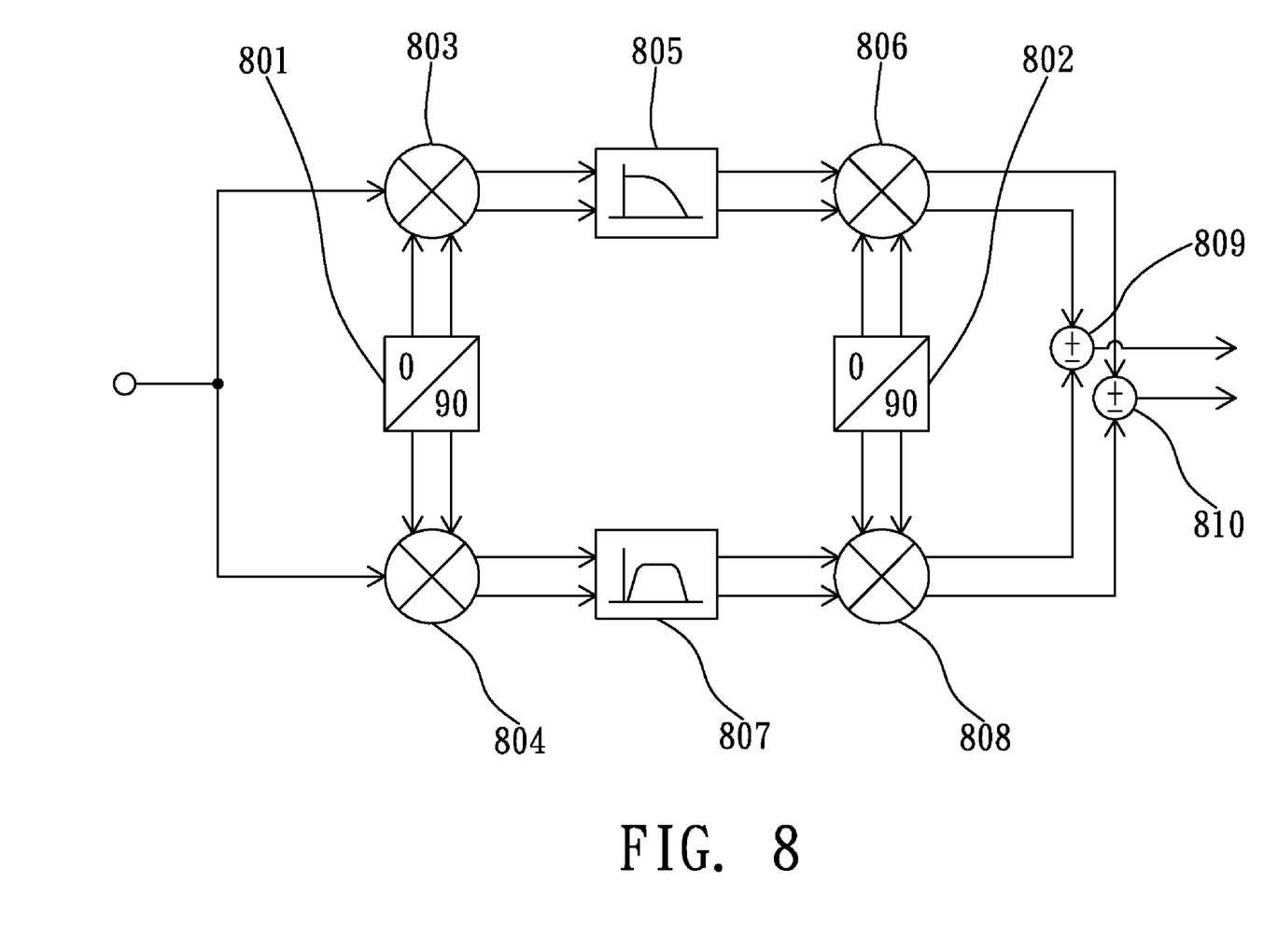
FIG. 8 is a block diagram of another preferred embodiment of the present invention for interference cancellation.

Please refer to FIG. 8, which shows the block diagram of another preferred embodiment of interference cancellation circuit of the present invention. The principle of this embodiment inherits the preceding ones, except that this embodiment adopts a quadrature-phases (0°/90°) structure. As shown in the FIG. 8, the block diagram comprises a LO 801, a LO 802, a mixer 803, a LPF 804, a mixer 805, a mixer 806, a BPF 807, a mixer 808, a combiner 809 and a combiner 810.

In this embodiment, the LO 801 is used for generating a pair of quadrature-phases type first oscillating signals at the carry frequency of an incoming signal. The pair of quadrature-phases type first oscillating signals include an oscillating signal of 0°-phase and an oscillating signal of 90°-phase. The incoming signal is composed of a transmitted signal and at least one interferer. The signal path of the LO 801 is of differential mode.

The LO 802 is used for generating a pair of quadrature-phases type second oscillating signals at the carry frequency of an incoming signal. The signal path of the LO 802 is of differential mode.

The mixer 803 is used for generating a pair of quadrature-phases type first converted signals carried on a second carrier frequency according to the incoming signal, under the control of the pair of quadrature-phases type first oscillating signals.

The mixer 804 is used for generating a pair of quadrature-phases type second converted signals carried on the second carrier frequency according to the incoming signal, under the control of the pair of quadrature-phases type first oscillating signals.

The LPF 805 is used for retaining a pair of quadrature-phases type first filtered signals according to the pair of quadrature-phases type first converted signals. The pair of quadrature-phases type first filtered signals are composed of a pair of quadrature-phases type first path retained signals and a pair of quadrature-phases type first path retained interference signals.

The mixer 806 is used for generating a pair of quadrature-phases type first processed signals carried on the first carrier frequency according to the pair of quadrature-phases type first filtered signals, under the control of the pair of quadrature-phases type second oscillating signals. The pair of quadrature-phases type first processed signals are composed of a pair of quadrature-phases type first path interference signals, and a pair of quadrature-phases type output signals of which one is proportional to the original signal.

The BPF 807 is used for retaining a pair of quadrature-phases type second filtered signals carried on the second carrier frequency according to the pair of quadrature-phases type second converted signals. The pair of quadrature-phases type second filtered signals being composed of a pair of quadrature-phases type second path retained interference signals of which the spectrum profile is determined according to a phase-matched and amplitude-matched version of the pair of quadrature-phases type first path retained interference signals.

The mixer 808 is used for generating a pair of quadrature-phases type second processed signals according to the pair of quadrature-phases type second filtered signals, under the control of the pair of quadrature-phases type second oscillating signals. The quadrature-phases type second processed signals are composed of a pair of quadrature-phases type second path interference signals of which the spectrum profile is determined according to a matched-phase and matched-amplitude version of the pair of quadrature-phases type first path interference signals.

The combiner 809 and combiner 810 are used for generating a pair of quadrature-phases type output signals of which one is proportional to the original signal, by subtracting the pair of quadrature-phases type second processed signals from the pair of quadrature-phases type first processed signals.

In the above preferred embodiments, the combiner can also perform addition to achieve interference cancellation if the filtered signal is further complemented.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. An interference cancellation circuit for a receiver capable of performing interference cancellation on an input signal, said input signal being carried on a first carrier frequency and including a transmitted signal and at least one interference signals, the interference cancellation circuit comprising:
   a local oscillator for generating an oscillating signal at the first carrier frequency;
   a down-converter for receiving the oscillating signal from the local oscillator and converting the input signal from the first carrier frequency to dc location to generate a down-converted signal;
   a first path circuit for processing the down-converted signal from the down-converter to generate a first processed, wherein the first processed signal includes the transmitted signal and the interference signals;
   a second path circuit being symmetric to the first path circuit and for processing the down-converted signal from the down-converter to generate a second processed signal without the transmitted signal, wherein the second processed signal only includes the interference signals;
   a combiner for generating an output signal by combining the first processed signal and the second processed signal;
   a first filter for processing the down-converted signal to generate a first filtered signal;

a first up-converter for receiving the oscillating signal from the local oscillator and converting the first filtered signal from dc frequency to the first carrier frequency to generate the first processed signal, wherein the second path comprises:

a second filter for processing the down-converted signal to generate a second filtered signal without the transmitted signal; and a second up-converter for receiving the oscillating signal from the local oscillator and converting the second filtered signal from dc frequency to the first carrier frequency to generate the second processed signal.

2. The interference cancellation circuit as recited in claim 1, wherein the combiner combines the first processed signal and the second processed signal by performing subtraction or addition.

3. The interference cancellation circuit as recited in claim 1, wherein the first filter is a low-pass filter and the second filter is a band-pass filter.

4. The interference cancellation circuit as recited in claim 1, wherein said first filter is a low-pass filter and said second filter is a high-pass filter.

5. The interference cancellation circuit as recited in claim 1, wherein said first filter is an all-pass filter and said second filter is a high-pass filter.

6. The interference cancellation circuit as recited in claim 1, wherein the down-converter is configured to be one of the single end mode, the differential mode, and the combination thereof.

7. The interference cancellation circuit as recited in claim 1, wherein the local oscillator is configured to be one of the single-phase type, the quadrature-phases type, and the combination thereof.

* * * * *